US010533084B2

(12) United States Patent
Lin et al.

(10) Patent No.: US 10,533,084 B2
(45) Date of Patent: Jan. 14, 2020

(54) POLYETHYLENE COMPOSITIONS HAVING LIVING HINGE PROPERTIES

(71) Applicant: Dow Global Technologies LLC, Midland, MI (US)

(72) Inventors: Yijian Lin, Manvel, TX (US); Todd A. Hogan, Midland, MI (US); Ronald P. Markovich, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/773,222

(22) PCT Filed: Oct. 27, 2016

(86) PCT No.: PCT/US2016/058971
§ 371 (c)(1),
(2) Date: May 3, 2018

(87) PCT Pub. No.: WO2017/087131
PCT Pub. Date: May 26, 2017

(65) Prior Publication Data
US 2018/0319962 A1 Nov. 8, 2018

Related U.S. Application Data

(60) Provisional application No. 62/257,283, filed on Nov. 19, 2015.

(51) Int. Cl.
*C08L 23/00* (2006.01)
*C08L 23/04* (2006.01)
*B65D 65/38* (2006.01)
*B65D 47/08* (2006.01)

(52) U.S. Cl.
CPC ............. *C08L 23/04* (2013.01); *B65D 65/38* (2013.01); *B65D 47/08* (2013.01); *C08L 2205/025* (2013.01)

(58) Field of Classification Search
CPC ... C08L 25/04; C08L 2205/025; B65D 65/38; B65D 47/08
See application file for complete search history.

(56) References Cited

U.S. PATENT DOCUMENTS

| | | | |
|---|---|---|---|
| 4,100,105 A | 7/1978 | Levine et al. | |
| 6,022,933 A | 2/2000 | Wright et al. | |
| 8,344,068 B2 | 1/2013 | Michie, Jr. et al. | |
| 8,445,594 B2 | 5/2013 | Michie, Jr. et al. | |
| 8,697,806 B2 | 4/2014 | Michie, Jr. et al. | |
| 2005/0256271 A1 | 11/2005 | Lustiger et al. | |
| 2010/0056727 A1* | 3/2010 | LiPiShan et al. | C08L 23/04 525/240 |
| 2013/0331496 A1 | 12/2013 | Domoy et al. | |
| 2013/0343808 A1 | 12/2013 | Domoy et al. | |
| 2015/0259519 A1 | 9/2015 | Wang et al. | |
| 2016/0237266 A1 | 8/2016 | Michie, Jr. et al. | |

FOREIGN PATENT DOCUMENTS

| | | |
|---|---|---|
| CA | 2798854 A1 | 6/2014 |
| EP | 2218751 A1 | 8/2010 |
| WO | 2004094489 A1 | 11/2004 |
| WO | 2004101674 A1 | 11/2004 |
| WO | 2009097222 A1 | 8/2009 |
| WO | 2014126839 A1 | 8/2014 |
| WO | 2015132680 A1 | 9/2015 |

OTHER PUBLICATIONS

Mourey, Chromatography Polym., 1992, Ch. 12, p. 180-198.
Mourey, Chromatography Polym., 1992, Ch. 13, p. 199-219.
Zimm, J. Chem. Phys., 1948, vol. 16, p. 1099-1116.
PCT/US2016/058971, International Search Report and Written Opinion dated Dec. 16, 2016.
PCT/US2016/058971, International Preliminary Report on Patentability dated May 31, 2018.

* cited by examiner

*Primary Examiner* — Nathan M Nutter

(57) ABSTRACT

A polyethylene composition suitable for use in a living hinge component, the composition comprising a first ethylene-based polymer component, wherein the first ethylene-based polymer component has a density of from 0.940 g/cc to less than 0.960 g/cc, a melt index, $I_{2.16}$, of less than 0.5 g/10 min, and a weight average molecular weight, $M_{w,cc}$, as measured by gel permeation chromatography using conventional calibration, of greater than or equal to 200,000 g/mol, and a second ethylene-based polymer component, wherein the composition has an overall density of from 0.945 g/cc to 0.960 g/cc and an overall melt index, $I_{2.16}$, of from 10 g/10 min to 70 g/10 min.

11 Claims, 2 Drawing Sheets

POLYETHYLENE COMPOSITIONS HAVING LIVING HINGE PROPERTIES

TECHNICAL FIELD

Embodiments of the present disclosure generally relate to polyethylene compositions, and more particularly to high density polyethylene compositions suitable for use in living hinge applications.

BACKGROUND

A living hinge is a thin, flexible hinge connecting two relatively rigid parts. It is usually made from the same material as the rigid parts. It may be used to join rigid parts of a container, allowing them to bend along the line of the hinge. Polypropylene (PP) has traditionally dominated the living-hinge dispensing closure market as it is easily processed and has good hinge durability characteristics. Additionally, it is widely available and historically had favorable economics relative to polyethylene when utilized to these ends.

These attributes coupled with PP's overall balance of properties make it a frequent choice for living-hinge closure applications, as well as many molding applications.

In addition, it has become more desirable to have a closure that is made from the same type of polymer as the bottle to enable recycling of the entire container. Further, polyethylene has not always been a suitable replacement of PP due to poor living hinge durability, especially when a high melt index is needed for polyethylene to have good processability. That is, polyethylene has not necessarily proven to be mechanically strong enough to last a large number of flexing cycles.

Accordingly, it may be desirable to produce polyethylene compositions having improved processability and/or longer living hinge durability.

SUMMARY

Disclosed in embodiments herein are polyethylene compositions suitable for use in living hinge components. The compositions comprise a first ethylene-based polymer component, wherein the first ethylene-based polymer component has a density of from 0.940 g/cc to less than 0.960 g/cc, a melt index, $I_{2.16}$, of less than 0.5 g/10 min, and a weight average molecular weight, $M_{w,cc}$, as measured by gel permeation chromatography using conventional calibration of greater than or equal to 200,000 g/mol, and a second ethylene-based polymer component, wherein the composition has an overall density of from 0.945 g/cc to 0.960 g/cc and an overall melt index, $I_{2.16}$, of from 10 g/10 min to 70 g/10 min.

Also disclosed in embodiments herein are living hinge components. The living hinge components comprise a polyethylene composition, the composition comprising a first ethylene-based polymer component, the first ethylene-based polymer component has a density of from 0.940 g/cc to less than 0.960 g/cc, a melt index, $I_{2.16}$, of less than 0.5 g/10 min, and a weight average molecular weight, $M_{w,cc}$, as measured by gel permeation chromatography using conventional calibration of greater than or equal to 200,000 g/mol, and a second ethylene-based polymer component, wherein the composition has an overall density of from 0.945 g/cc to 0.960 g/cc and an overall melt index, $I_{2.16}$, of from 10 g/10 min to 70 g/10 min.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
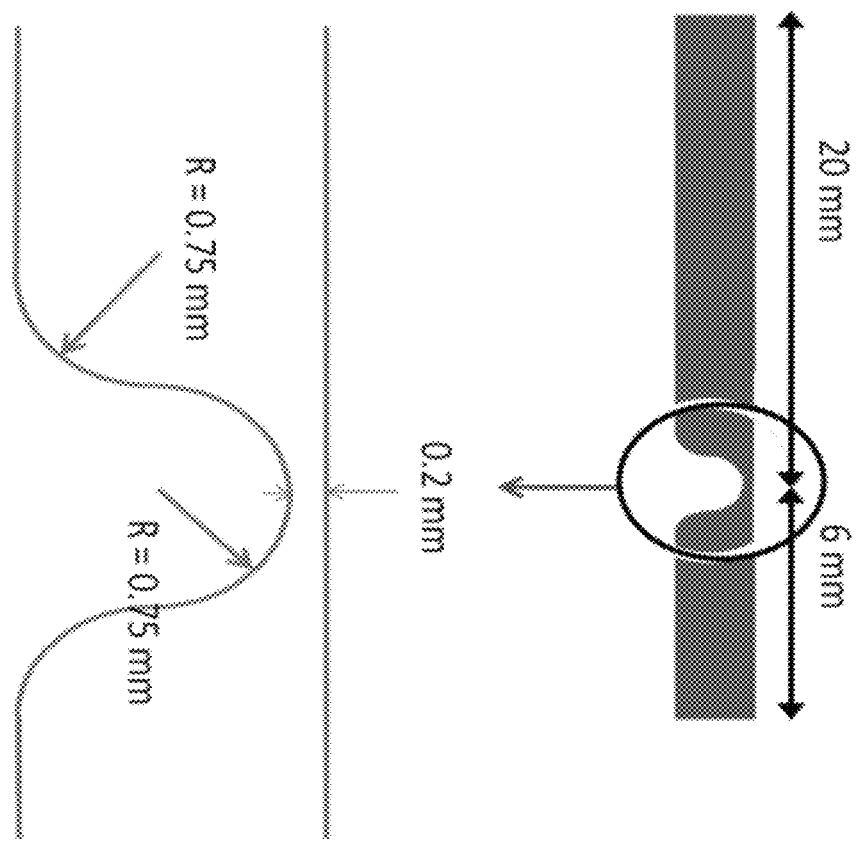
FIG. 1 pictorially depicts the geometry of a living hinge made according to one or more embodiments shown or described herein.

Reference will now be made in detail to embodiments of polyethylene compositions and living hinge components. The polyethylene compositions may be used to form living hinge components. It is noted, however, that this is merely an illustrative implementation of the embodiments described herein. The embodiments are applicable to other technologies that are susceptible to similar problems as those discussed above. For example, the polyethylene compositions described herein may be used in other closure applications, such as, hot-fill and/or aseptic closure applications.

Disclosed is a composition suitable for use in a molded component, particularly, a living hinge component. The composition includes a first ethylene-based polymer component and a second ethylene-based polymer component. The term "ethylene-based" as used herein means that the polymer component contains more than 50 weight percent of ethylene monomer in polymerized form (based on the total amount of polymerizable monomers) and, optionally, may contain at least one comonomer.

First Ethylene-Based Polymer Component

In embodiments herein, the first ethylene-based polymer component of the composition may be an ethylene-based interpolymer, ethylene homopolymer, ethylene/α-olefin interpolymer, homogeneously branched ethylene-based interpolymer or copolymer, or a heterogeneously branched ethylene-based interpolymer or copolymer. The first ethylene-based polymer component may be unimodal or may be bimodal, where it has a molecular weight distribution in a gel permeation chromatography curve that exhibits two peaks. Descriptions of exemplary bimodal resins, including how to manufacture, are described in U.S. Pat. No. 8,344,068 and WO/2014/126839. Homogeneously branched interpolymers may be produced, for example, by single-site catalyst systems, and contain a substantially homogeneous distribution of comonomer among the molecules of the interpolymer. Heterogeneously branched interpolymers may be produced by Ziegler-Natta type catalysts or chromium-based catalysts, and contain a non-homogeneous distribution of comonomer among the molecules of the interpolymer. The comonomer may be an α-olefin. In some embodiments, the first ethylene-based polymer component may be polymerized using Ziegler-Natta catalysts to form a bimodal polymer. In other embodiments, the first ethylene-based polymer component may be polymerized using chromium-based catalysts.

Suitable methods to polymerize ethylene monomers using chromium-based catalysts are generally known in the art, and may include gas-phase, solution phase and slurry-phase polymerization processes. In some embodiments, the first ethylene-based polymer component may be polymerized in a gas-phase process, using a chromium catalyst, and in particular, a titanated chromium catalyst. Chromium catalysts and polymerization methods are further described in EP2218751, WO2004/094489, U.S. Pat. Nos. 4,100,105, and 6,022,933, which are incorporated herein in its entirety by reference. In some embodiments, the first ethylene-based polymer component is an ethylene/α-olefin interpolymer, and further an ethylene/α-olefin copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers. "Ethylene/alpha-olefin copolymer" refers to a polymer comprising repeating units derived from ethylene and one alpha-olefin comonomer. "Ethylene homopolymer" refers to a polymer that consists essentially of repeating units derived from ethylene. In some examples, an ethylene homopolymer contains at least 99 percent by weight of ethylene units, at least 99.5% by weight of ethylene units, at least 99.8% by weight of ethylene units, or at least 99.9% by weight of ethylene units.

Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, 4-methyl-1-pentene, and 1-octene. In further embodiments, α-olefins are selected from the group consisting of 4-methyl-1-pentene, 1-butene and 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EB and EH copolymers.

In embodiments herein, the density of the first ethylene-based polymer component is from 0.940 g/cc to less than 0.960 g/cc. All individual values and subranges of 0.940 to less than 0.960 g/cc are included and disclosed herein. For example, in some embodiments, the density of the first ethylene-based polymer component is from 0.942 to less than 0.960 g/cc. In other embodiments, the density of the first ethylene-based polymer component is from 0.945 to less than 0.960 g/cc. In further embodiments, the density of the first ethylene-based polymer component is from 0.947 to less than 0.960 g/cc. Densities disclosed herein for ethylene-based polymers are determined according to ASTM D-792.

In embodiments herein, the melt index, or $I_{2.16}$, of the first ethylene-based polymer component is less than 0.5 g/10 min. All individual values and subranges of less than 0.5 g/10 min are included and disclosed herein. For example, in some embodiments, the melt index of the first ethylene-based polymer component is less than 0.4 g/10 min. In other embodiments, the melt index of the first ethylene-based polymer component is less than 0.3 g/10 min. In further embodiments, the melt index of the first ethylene-based polymer component is less than 0.2 g/10 min. Melt index, or $I_{2.16}$, for ethylene-based polymer components is determined according to ASTM D1238 at 190° C., 2.16 kg.

In embodiments herein, the first ethylene-based polymer component may have a melt index, $I_{21.6}$, of from 1 to 20 g/10 min. All individual values and subranges of 1 to 20 g/10 min are included and disclosed herein. For example, in some embodiments, the first ethylene-based polymer component may have a melt index, $I_{21.6}$, of from 2 to 18 g/10 min. In other embodiments, the first ethylene-based polymer component may have a melt index, $I_{21.6}$, of from 3 to 16 g/10 min. Melt index, or $I_{21.6}$, for ethylene-based polymer components is determined according to ASTM D1238 at 190° C., 21.6 kg.

In embodiments herein, the first ethylene-based polymer component may have a weight average molecular weight ($M_{w,cc}$, where the subscript "cc" means conventional calibration) of greater than or equal to 200,000 g/mol. All individual values and subranges of greater than or equal to 200,000 g/mol are included and disclosed herein. For example, in some embodiments, the first ethylene-based polymer component may have a weight average molecular weight ($M_{w,cc}$) of greater than or equal to 205,000 g/mol. In other embodiments, the first ethylene-based polymer component may have a weight average molecular weight ($M_{w,cc}$) of greater than or equal to 210,000 g/mol. In further embodiments, the first ethylene-based polymer component may have a weight average molecular weight ($M_{w,cc}$) of greater than or equal to 215,000 g/mol, greater than or equal to 220,000 g/mol, or greater than or equal to 225,000 g/mol. The weight average molecular weight ($M_{w,cc}$) may be determined by Gel Permeation Chromatography (GPC).

In embodiments herein, the first ethylene-based polymer component may have a molecular weight distribution ($M_{w,cc}/M_{n,cc}$ where $M_{n,cc}$ is number average molecular weight as measured by gel permeation chromatography using conventional calibration), of greater than or equal to 15. All individual values and subranges of greater than or equal to 15 are included and disclosed herein. For example, in some embodiments, the first ethylene-based polymer component may have a molecular weight distribution ($M_{w,cc}/M_{n,cc}$) of greater than or equal to 16. In other embodiments, the first ethylene-based polymer component may have a molecular weight distribution ($M_{w,cc}/M_{n,cc}$) of greater than or equal to 18. In further embodiments, the first ethylene-based polymer component may have a molecular weight distribution ($M_{w,cc}/M_{n,cc}$) of greater than or equal to 19. In even further embodiments, the first ethylene-based polymer component may have a molecular weight distribution ($M_{w,cc}/M_{n,cc}$) of from 15 to 30, from 15 to 25, from 16 to 30, from 16 to 25, from 18 to 30, from 18 to 25, from 19 to 30, or from 19 to 25.

In embodiments herein, the first ethylene-based polymer component may have a complex viscosity ratio, $V_{0.1}/V_{100}$, of greater than or equal to 10. All individual values and subranges of greater than or equal to 10 are included and disclosed herein. For example, in some embodiments, the first ethylene-based polymer component may have a complex viscosity ratio, $V_{0.1}/V_{100}$, of greater than or equal to 15, 20, 25, 28, or 30. In other embodiments, the first ethylene-based polymer component may have a complex viscosity ratio, $V_{0.1}/V_{100}$, of from 10 to 75, 15 to 75, 20 to 75, 25 to 75, 28 to 75, 30 to 75, 10 to 65, 15 to 65, 20 to 65, 25 to 65, 28 to 65, 30 to 65, 10 to 55, 15 to 55, 20 to 55, 25 to 55, 28 to 55, or 30 to 55.

Second Ethylene-Based Polymer Component

In embodiments herein, the second ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an alpha-olefin as described herein. In some embodiments, the second ethylene-based polymer component is an ethylene-based interpolymer. In other embodiments, the second ethylene-based polymer component is a polyethylene homopolymer. In further embodiments, the second ethylene-based polymer component is a mixture of a polyethylene homopolymer and an ethylene/α-olefin interpolymer. The second ethylene-based polymer component may be formed using a Ziegler-Natta Catalyst, a single-site catalyst, or combinations thereof.

In embodiments herein, the density of the second ethylene-based polymer component is from 0.940 to 0.970 g/cc. All individual values and subranges of 0.940 to 0.970 g/cc are included and disclosed herein. For example, in some embodiments, the density of the second ethylene-based polymer component is from 0.942 to 0.970 g/cc. In other embodiments, the density of the second ethylene-based polymer component is from 0.945 to 0.970 g/cc. In further embodiments, the density of the second ethylene-based polymer component is from 0.947 to 0.970 g/cc.

In embodiments herein, the melt index, or $I_{2.16}$, of the second ethylene-based polymer component is from 20 to 150 g/10 min. All individual values and subranges of from 20 to 150 g/10 min are included and disclosed herein. For example, in some embodiments, the melt index of the second ethylene-based polymer component is from 25 to 125 g/10 min. In other embodiments, the melt index of the second ethylene-based polymer component is from 30 to 100 g/10 min. In further embodiments, the melt index of the second ethylene-based polymer component is from 20 to 100 g/10 min, from 20 to 75 g/10 min, or from 25 to 75 g/10 min.

Polyethylene Compositions

In embodiments herein, the compositions may comprise from 7-70 wt. % of the first ethylene-based polymer component. All individual values and subranges of from 7-70 wt. % are included and disclosed herein. For example, in some embodiments, the composition may comprise from 7-65 wt. %, from 7-60 wt. %, from 7-50 wt. %, from 7-40 wt. %, from 7-35 wt. %, from 7-30 wt. %, from 7-25 wt. %, or from 7-20 wt. %, of the first ethylene-based polymer component. The composition may also comprise from 93-30 wt. % of the second ethylene-based polymer component. All individual values and subranges of 93-30 wt. % are included and disclosed herein. For example, in some embodiments, the composition may comprise from 93-40 wt. %, from 93-45 wt. %, from 93-50 wt. %, from 93-55 wt. %, from 93-60 wt. %, from 93-65 wt. %, from 93-70 wt. %, from 93-75 wt. %, or from 93-80 wt. %, of the second ethylene-based polymer component. The weight percentages are based on the sum weight of the first ethylene-based polymer component and the second ethylene-based polymer component.

The composition has an overall density of from 0.945-0.960 g/cc. All individual values and subranges of 0.945-0.960 g/cc are included and disclosed herein. For example, in some embodiments, the composition may have an overall density of from 0.947-0.960 g/cc, 0.950-0.960 g/cc, 0.950-0.958 g/cc, or from 0.950-0.957 g/cc. The composition has an overall melt index, $I_{2.16}$, of 10-70 g/10 min. All individual values and subranges of 10-70 g/10 min are included and disclosed herein. For example, in some embodiments, the composition may have an overall melt index of 10-65 g/10 min, 10-60 g/10 min, 10-55 g/10 min, 10-50 g/10 min, 10-45 g/10 min, 10-40 g/10 min, 10-35 g/10 min, 10-30 g/10 min, 10-25 g/10 min, or 10-23 g/10 min.

The composition may have an overall melt index, $I_{21.6}$, of from 100 to 615 g/10 min. All individual values and subranges of from 100 to 615 g/10 min are included and disclosed herein. For example, in some embodiments, the composition may have an overall melt index, $I_{21.6}$, of from 125 to 615 g/10 min. In other embodiments, the composition may have an overall melt index, $I_{21.6}$, of from 150 to 615 g/10 min, from 175 to 615 g/10 min, from 200 to 615 g/10 min, from 225 to 615 g/10 min, from 250 to 615 g/10 min, or from 275 to 615 g/10 min.

In embodiments herein, the composition may have a weight average molecular weight ($M_{w,cc}$) of from 60,000 g/mol to 150,000 g/mol. All individual values and subranges of from 60,000 g/mol to 150,000 g/mol are included and disclosed herein. For example, in some embodiments, the composition may have a weight average molecular weight ($M_{w,cc}$) of from 60,000 g/mol to 125,000 g/mol. In other embodiments, the composition may have a weight average molecular weight ($M_{w,cc}$) of from 60,000 g/mol to 100,000 g/mol. In further embodiments, the composition may have a weight average molecular weight ($M_{w,cc}$) of from 60,000 g/mol to 90,000 g/mol. The weight average molecular weight may be determined by Gel Permeation Chromatography (GPC) using conventional calibration.

In embodiments herein, the composition may have a viscosity at 100 rad/s and 190° C. of greater than $2.0 \times 10^2$ to $8.0 \times 10^2$ Pa·s. All individual values and subranges of greater than $2.0 \times 10^2$ to $8.0 \times 10^2$ Pa·s are included and disclosed herein. For example, in some embodiments, the composition may have a viscosity at 100 rad/s and 190° C. of from $2.0 \times 10^2$ to $7.75 \times 10^2$ Pa·s, $2.0 \times 10^2$ to $7.5 \times 10^2$ Pa s, $2.0 \times 10^2$ to $7.0 \times 10^2$ Pa s, $2.0 \times 10^2$ to $6.75 \times 10^2$ Pa·s, $2.0 \times 10^2$ to $6.5 \times 10^2$ Pa·s, $2.0 \times 10^2$ to $6.25 \times 10^2$ Pa·s, or $2.0 \times 10^2$ to $6.0 \times 10^2$ Pa·s. The viscosity may be determined as outlined below.

In embodiments herein, the composition may comprise a $M_{w,cc}$ of the first ethylene-based polymer component that is greater than the $M_{w,cc}$ of the second ethylene-based polymer component. In some embodiments, the $M_{w,cc}$ of the first ethylene-based polymer component is at least twice the $M_{w,cc}$ of the second ethylene-based polymer component. In other embodiments, the $M_{w,cc}$ of the first ethylene-based polymer component is at least three times the $M_{w,cc}$ of the second ethylene-based polymer component. In further embodiments, the $M_{w,cc}$ of the first ethylene-based polymer component is at least four times the $M_{w,cc}$ of the second ethylene-based polymer component.

In embodiments herein, the composition may contain one or more additives. Additives include, but are not limited to, processing aids, acid neutralizers, UV stabilizers, hydroperoxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents (e.g., metal salts of hexahydrophthalic acid (HHPA)), fatty acid stearates, fluoroelastomers, fillers, and combinations thereof. The composition may comprise from 0.001 to 10 wt. %, based on the weight of the composition, of the one or more additives.

In embodiments herein, the composition can be made by a variety of methods. For example, it may be made by blending or mixing the first ethylene-based polymer component and the second ethylene-based polymer component together. Alternatively, the composition may be made in a single reactor or a multiple reactor configuration, where the multiple reactors may be arranged in series or parallel, and where each polymerization takes place in solution, in slurry, in the gas phase, or a combination of reaction systems (e.g. combination of slurry and gas phase reactor). In some embodiments, a dual reactor configuration is used where the polymer made in the first reactor can be either the first ethylene-based polymer component or the second ethylene-based polymer component. The polymer made in the second reactor may have a density and melt index that the overall density and melt index of the composition is met. Similar polymerization processes are described in, for example, WO 2004/101674A, which is incorporated herein by reference.

In some embodiments herein, a method of manufacturing the compositions described herein may comprise blending a first ethylene-based polymer component, as described herein, with a second ethylene-based polymer component, as described herein, thereby producing a polyethylene composition. In other embodiments, a method of manufacturing the compositions described herein may comprise polymerizing a first ethylene-based polymer component, as described herein, in a reactor. polymerizing a second ethylene-based polymer component, as described herein, in a reactor, thereby producing a polyethylene composition. The two reactors may be operated in series. In some embodiments, the first ethylene-based polymer component is polymerized in a first reactor, and the second ethylene-based polymer component is polymerized in a second reactor. In other embodiments, the second ethylene-based polymer component is polymerized in a first reactor, and the first ethylene-based polymer component is polymerized in a second reactor.

The compositions described herein can be used to manufacture a shaped/molded article, or one or more components of a shaped/molded article. Such articles may be single-layer or multi-layer articles, which may be obtained by suitable known conversion techniques, applying heat, pressure, or a combination thereof, to obtain the desired article. Examples of suitable conversion techniques may include, for example, blow-molding, co-extrusion blow-molding, injection molding, injection stretch blow molding, compression molding, extrusion, pultrusion, calendering and thermoforming. Shaped/molded articles may include, for example, closures, lids, bottles, blow molded articles, injection molded articles, compression molded articles, drip tapes and tubings, geomembranes, films, sheets, fibers, profiles and moldings.

In embodiments herein, the compositions described herein may be particularly well-suited for use in manufacturing a shaped article or one or more components of a shaped article. In some embodiments, the compositions described herein may be particularly well-suited for use in manufacturing closures or lids. In other embodiments, the compositions described herein may be particularly well-suited for use in manufacturing single-piece closures or lids. In further embodiments, the compositions described herein may be particularly well-suited for use in manufacturing living hinge components.

In some embodiments, a living hinge component may be formed by providing a molding unit having a mold according to processes known in the art and generally described in Plastic Injection Molding, Volume 1-Manufacturing Process Fundamentals by Douglas M. Bryce, introducing a composition as described herein into the mold, closing the molding unit, allowing the introduced composition to be maintained in the molding unit until the termination of a molding cycle, and opening the molding unit and removing the component from the mold. Without being bound by theory, it is believed that the compositions described herein exhibit good flowability (e.g., sufficiently high melt index) so as to fill the entire mold in order to fabricate a living hinge component.

The living hinge component may have a thickness wherein the minimum thickness of the hinge portion is in the range of about 0.001 to 0.50 inches, about 0.005 to 0.025 inches, or about 0.01 to 0.014 inches. The living hinge component of the invention may have a ratio of the minimum thickness of the hinge portion to a maximum thickness of the hinged component that is less than or equal to 0.9, less than or equal to 0.5, or less than or equal to 0.3.

In some embodiments, the component exhibits a hinge durability of greater than 800 cycles, as measured by the Hinge Durability Test. In other embodiments, the component exhibits a hinge durability of greater than 850 cycles, as measured by the Hinge Durability Test.

In some embodiments, a living hinge component may be formed from the compositions described herein, and may include a filler, such as in amounts of approximately 0.1-80.0 wt. %. Suitable fillers for this purpose may include without limitation glass spheres, calcium carbonate, post-consumer recycle, glass fibers, talc, or any other organic or inorganic filler or combination thereof.

In some embodiments, a living hinge component may be formed from the compositions described herein, and further comprise additional components, such as, polypropylene.

Test Methods

Unless otherwise stated, the following test methods are used. All test methods are current as of the filing date of this disclosure.

Density

Measurements are made according to ASTM D792, Method B.

Melt Index

Melt index, $I_{2.16}$, for ethylene-based polymers is determined according to ASTM D1238 at 190° C., 2.16 kg. Melt Index, $I_{21.6}$, for ethylene-based polymers is determined according to ASTM D1238 at 190° C., 21.6 kg.

Gel Permeation Chromatography

For the GPC techniques used herein (Conventional GPC and Light Scattering ("LS") GPC), a Triple Detector Gel Permeation Chromatography (3D-GPC or TDGPC) system is used. This system consists of a PolymerChar (Valencia, Spain) GPC-IR High Temperature Chromatograph, equipped with a Precision Detectors (Now Agilent Technologies) 2-angle laser light scattering (LS) detector Model 2040, an IR5 infra-red detector and 4-capillary viscometer detector from PolymerChar. Data collection is performed using PolymerChar "Instrument Control" software. The system is also equipped with an on-line solvent degassing device from Agilent Technologies (CA, USA).

The eluent from the GPC column set flows through each detector arranged in series, in the following order: IR5 detector, LS detector, then the Viscometer detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Four 20-micron mixed-pore-size packing ("Mixed A", Agilent Technologies) are used for the separation. The PolymerChar Autosampler oven compartment is operated at 160° C. with low speed shaking for 3 hours, and the column compartment is operated at 150° C. The samples are prepared at a concentration of "2 milligrams per milliliter." The chromatographic solvent and the sample preparation solvent is 1,2,4-trichlorobenzene (TCB) containing "200 ppm of 2,6-di-tert-butyl-4methylphenol (BHT)." The solvent is sparged with nitrogen. The injection volume is 200 microliters. The flow rate through the GPC is set at 1 ml/minute. For this study, conventional GPC data and light scattering GPC data are recorded.

For Conventional GPC, the IR5 detector ("measurement sensor") is used, and the GPC column set is calibrated by running 21 narrow molecular weight distribution polystyrene standards. The molecular weight (MW) of the standards range from 580 g/mol to 8,400,000 g/mol, and the standards are contained in 6 "cocktail" mixtures. Each standard mixture has at least a decade of separation between individual molecular weights. The standard mixtures are purchased from Polymer Laboratories (now Agilent Technologies). The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weight using Equation (1) (as described in Williams and Ward, J. Polym. Sci., Polym. Letters, 6, 621 (1968)):

$$MW_{PE} = A \times (MW_{PS})^B \quad \text{(Eq. 1)}$$

where MW is the molecular weight of polyethylene (PE) or polystyrene (PS) as marked, and B is equal to 1.0. It is known to those of ordinary skill in the art that A may be in a range of about 0.38 to about 0.44 such that the A value yields 52,000 $MW_{PE}$ for Standard Reference Materials (SRM) 1475a. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$M_{n,cc} = \Sigma w_i / \Sigma (w_i / M_{cc,i}) \quad \text{(Eq. 2)}$$

$$M_{w,cc} = \Sigma w_i M_{cc,i} \quad \text{(Eq. 3)}$$

$$M_{z,cc} = \Sigma (w_i M_{cc,i}^2) / \Sigma (w_i M_{cc,i}) \quad \text{(Eq. 4)}$$

where $M_{n,cc}$, $M_{w,cc}$, and $M_{z,cc}$ are the number-, weight-, and z-average molecular weight obtained from the conventional calibration, respectively. $w_i$ is the weight fraction of the polyethylene molecules eluted at retention volume $V_i$. $M_{cc,i}$ is the molecular weight of the polyethylene molecules eluted at retention volume $V_i$ obtained using the conventional calibration (see Equation (1)).

For the LS GPC, the Precision Detector PDI2040 detector Model 2040 15° angle is used. The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used in the determination of the molecular weight, is obtained from the mass detector (IR5) area, and the mass detector constant, derived from a suitable linear polyethylene homopolymer, or one of the polyethylene standards of known weight-average molecular weight. The calculated molecular weights are obtained using a light scattering constant, derived from one or more of the polyethylene standards mentioned below, and a refractive index concentration coefficient, dn/dc, of 0.104. Generally, the mass detector response and the light scattering constant should be determined from a linear standard with a molecular weight in excess of about 50,000 g/mol. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight-average molecular weight ("$M_{w,abs}$") and absolute z-average molecular weight ("$M_{z,abs}$") are determined using Equations (5) and (6) below, using the "peak area" method (after detector calibration relating areas to mass and mass-molecular weight product) for higher accuracy and precision. The "LS.Area" and the "Concentration.Area" are generated by the chromatograph/detectors combination.

$$M_{w,abs} = \frac{\sum C_i M_{abs,i}}{\sum C_i} = \frac{\sum LS_i}{\sum C_i} = \frac{LS \cdot \text{Area}}{\text{Concentration} \cdot \text{Area}} \quad \text{(Eq. 5)}$$

$$M_{z,abs} = \sum (w_i M_{abs,i}^2) / \sum (w_i M_{abs,i}) \quad \text{(Eq. 6)}$$

where $C_i$ is the concentration of the polyethylene molecules in the eluant at the retention volume $V_i$, $M_{abs,i}$ is the absolute molecular weight of the polyethylene molecules at the retention volume $V_i$, $\Sigma LS_i$ (LS.Area) is the total response of the light scattering, and the $\Sigma C_i$ (Concentration.Area) is the total concentration.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

Rheology—Viscosity

The test sample in the rheology measurement is prepared from a compression molded plaque. A piece of aluminum foil is placed on a back plate, and a template or mold is placed on top of the back plate. Approximately 3.2 grams of resin is placed in the mold, and a second piece of aluminum foil is placed over the resin and mold. A second back plate is then placed on top of the aluminum foil. The total ensemble is put into a compression molding press and pressed for 6 min at 190° C. under 25000 psi. The sample is then removed and laid on the counter to cool to room temperature. A 25 mm disk is stamped out of the compression-molded plaque. The thickness of this disk is approximately 3.0 mm.

The rheology measurement to determine the viscosity at 0.1 rad/s and the viscosity at 100 rad/s is done in a nitrogen environment, at 190° C., and a strain of 10%. The stamped-out disk is placed between the two "25 mm" parallel plates located in an ARES-1 (Rheometrics SC) rheometer oven, which is preheated, for at least 30 minutes, at 190° C., and the gap of the "25 mm" parallel plates is slowly reduced to 2.0 mm. The sample is then allowed to remain for exactly 5 minutes at these conditions. The oven is then opened, the excess sample is carefully trimmed around the edge of the plates, and the oven is closed. The method has an additional five minute delay built in, to allow for temperature equilibrium. Then the viscosity at 0.1 rad/s and viscosity at 100 rad/s are measured via a small amplitude, oscillatory shear, according to an increasing frequency sweep from 0.1 to 100 rad/s. The complex viscosity at 0.1 rad/s ($V_{0.1}$), the complex viscosity at 100 rad/s ($V_{100}$), and the complex viscosity ratio ($V_{0.1}/V_{100}$) are calculated from these data.

Living Hinge Durability

The blends are generated in a 30 mm co-rotating, intermeshing Coperion Werner-Pfleiderer ZSK-30 twin screw extruder and then pelletized for the subsequent injection molding process. The ZSK-30 has ten barrel sections with an overall length of 960 mm and an L/D ratio of 32. The temperature is set at 80° C. (zone 1—feed), 160° C. (zone 2), 180° C. (zone 3), 185° C. (zone 4), 195° C. (zone 5), and 210° C. (die).

The blends prepared with the ZSK-30 are injection molded into bars using a lab scale injection molding equipment Morgan Press made by Morgan Industries Inc. (Long Beach, Calif., USA). The geometry of the injection molded samples is shown in FIG. 1. The sample bars are 26 mm in length, 5 mm in width and 1.7 mm in thickness. The sample bars have a hinge with a thickness of 0.2 mm. The injection direction is along the length direction. Both the barrel temperature and the nozzle temperature are set at 210° C. Mold temperature is set at room temperature. The ram pressure is set at 8000 psi and the pilot pressure is set at 60 psi. The clamp force is at 12 tons. In each injection cycle, the pressure holding time is 6 seconds, followed by 24 seconds for cooling and 30 seconds for releasing the mold, removing the sample out of the mold, closing the mold, and filling more materials into the barrel. The entire cycle time is 1 minute.

Figure 2:
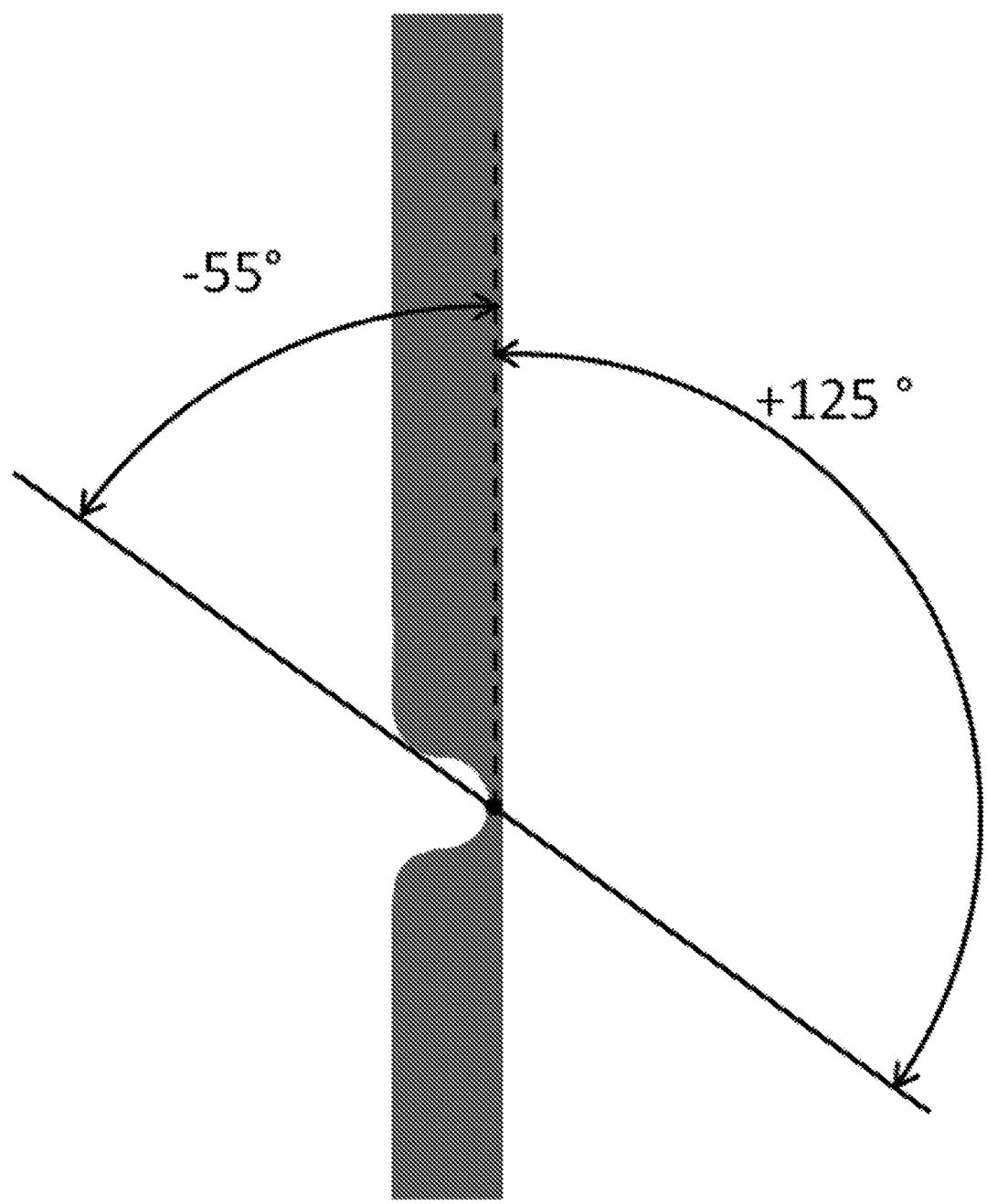
FIG. 2 pictorially depicts the rotation of the hinge durability test on a living hinge made according to one or more embodiments shown or described herein.

The hinge durability is measured with an automatic pneumatic hinge durability tester. The 6 mm part of the sample bar is affixed to a stationary holder and the 20 mm part is rotated between −55° to +1250 with the hinge as the center of rotation as shown in FIG. 2. The hinge durability tester has 10 sample holders and 10 sample bars from each resin are tested at the same time. The sample bars are initially held at the −55° position, rotated to the +125° position at a speed of about 0.1 s/180°, held at the +125° position for 5 seconds, rotated back to the −55° position at a speed of about 0.1 s/180°, held at the −55° position for 5 seconds to complete one cycle. The cycle at which a failure indicated by a complete breakage of the hinge is observed and recorded for each sample bar. All hinge durability testing is completed at 23° C. and atmospheric pressure.

EXAMPLES

The embodiments described herein may be further illustrated by the following non-limiting examples.

TABLE 1

Inventive & Comparative Resin Properties

| | Density (g/cc) | Melt Index, $I_{2.16}$ (g/10 min) | Melt Index, $I_{21.6}$ (g/10 min) | $I_{21.6}/I_{2.16}$ |
|---|---|---|---|---|
| CONTINUUM ™ DMDA-1250 NT7, available from The Dow Chemical Company (Midland, MI) | 0.955 | 1.5 | 100 | 66.7 |
| CONTINUUM ™ DGDA-2490 NT, available from The Dow Chemical Company (Midland, MI) | 0.949 | 0.08 | 7 | 87.5 |
| CONTINUUM ™ DGDA-2492 NT, available from The Dow Chemical Company (Midland, MI) | 0.949 | 0.06 | 5.5 | 91.7 |
| UNIVAL ™ DMDC-6143 NT 7, available from The Dow Chemical Company (Midland, MI) | 0.952 | 0.13 | 14 | 107.7 |
| UNIVAL ™ DMDA-6147 NT 7, available from The Dow Chemical Company (Midland, MI) | 0.948 | <0.15 | 10 | >67 |
| UNIVAL ™ DMDC-6150 NT7, available from The Dow Chemical Company (Midland, MI) | 0.955 | 0.03 | 5.6 | 187 |
| DOW DMDA-8940 NT7, available from The Dow Chemical Company (Midland, MI) | 0.951 | 44 | 840 | 19.1 |
| ELTEX ® B4020N1331, available from Ineos Olefins & Polymers Europe | 0.952 | 2.2 | 66 | 30 |

TABLE 2

Inventive & Comparative GPC Data

| | $M_{w,cc}$ g/mol | $M_{n,cc}$ g/mol | $M_{z,cc}$ g/mol | MWD ($M_{w,cc}/M_{n,cc}$) | $M_{w, abs}$ g/mol | $M_{z, abs}$ g/mol |
|---|---|---|---|---|---|---|
| CONTINUUM ™ DMDA-1250 NT7, available from The Dow Chemical Company (Midland, MI) | 121,948 | 9,569 | 662,014 | 12.76 | 155,893 | 1,492,987 |
| CONTINUUM ™ DGDA-2490 NT, available from The Dow Chemical Company (Midland, MI) | 240,432 | 10,761 | 1,296,193 | 22.36 | 265,445 | 1,449,338 |
| CONTINUUM ™ DGDA-2492 NT, available from The Dow Chemical Company (Midland, MI) | 275,012 | 11,591 | 1,597,035 | 23.72 | 310,780 | 1,910,739 |
| UNIVAL ™ DMDC-6143 NT7, available from The Dow Chemical Company (Midland, MI) | 236,116 | 11,442 | 2,508,374 | 20.64 | 217,121 | 1,832,644 |
| UNIVAL ™ DMDA-6147 NT7, available from The Dow Chemical Company (Midland, MI) | 255,547 | 12,400 | 2,367,852 | 20.61 | 237,080 | 1,760,612 |
| UNIVAL ™ DMDC-6150 NT7, available from The Dow Chemical Company (Midland, MI) | 295,399 | 13,546 | 2,615,825 | 21.85 | 275,389 | 1,877,697 |
| DOW DMDA-8940 NT7, available from The Dow Chemical Company (Midland, MI) | 45,889 | 9,448 | 200,227 | 4.86 | 61,046 | 1,891,889 |
| ELTEX ® B4020N1331, available from Ineos Olefins & Polymers Europe | 110,972 | 15,640 | 534,665 | 7.10 | 184,149 | 2,813,559 |

TABLE 3

Inventive & Comparative Complex Viscosity Data

| | $V_{0.1}$ Pa · s | $V_{100}$ Pa · s | $V_{0.1}/V_{100}$ |
|---|---|---|---|
| CONTINUUM ™ DMDA-1250 NT7, available from The Dow Chemical Company (Midland, MI) | 7,862 | 937 | 8.4 |
| CONTINUUM ™ DGDA-2490 NT, available from The Dow Chemical Company (Midland, MI) | 83,791 | 2,644 | 31.7 |
| CONTINUUM ™ DGDA-2492 NT, available from The Dow Chemical Company (Midland, MI) | 138,640 | 2,742 | 50.6 |
| UNIVAL ™ DMDC-6143 NT7, available from The Dow Chemical Company (Midland, MI) | 55,342 | 1,735 | 31.9 |
| UNIVAL ™ DMDA-6147 NT7, available from The Dow Chemical Company (Midland, MI) | 80,989 | 2,036 | 39.8 |
| UNIVAL ™ DMDC-6150 NT7, available from The Dow Chemical Company (Midland, MI) | 124,690 | 2,597 | 48.0 |
| DOW DMDA-8940 NT7, available from The Dow Chemical Company (Midland, MI) | 176 | 134 | 1.3 |
| ELTEX ® B4020N1331, available from Ineos Olefins & Polymers Europe | 4,336 | 1,025 | 4.2 |

Inventive & Comparative Compositions

The inventive and comparative compositions were prepared as outlined above for the Living Hinge Test. The compositions were generated in a 30 mm co-rotating, intermeshing Coperion Werner-Pfleiderer ZSK-30 twin screw extruder and then pelletized for the subsequent injection molding process. The ZSK-30 has ten barrel sections with an overall length of 960 mm and an L/D ratio of 32. The temperature is set at 80° C. (zone 1—feed), 160° C. (zone 2), 180° C. (zone 3), 185° C. (zone 4), 195° C. (zone 5), and 210° C. (die). Tables 4 and 5 below further provide additional description of the inventive and comparative compositions.

The blends prepared with the ZSK-30 are injection molded into bars using a lab scale injection molding equipment Morgan Press made by Morgan Industries Inc. (Long Beach, Calif., USA). The geometry of the injection molded samples is shown in FIG. 1. The sample bars are 26 mm in length, 5 mm in width and 1.7 mm in thickness. The sample bars have a hinge with a thickness of 0.2 mm. The injection direction is along the length direction. Both the barrel temperature and the nozzle temperature are set at 210° C. Mold temperature is set at room temperature. The ram pressure is set at 8000 psi and the pilot pressure is set at 60 psi. The clamp force is at 12 tons. In each injection cycle, the pressure holding time is 6 seconds, followed by 24 seconds for cooling and 30 seconds for releasing the mold, removing the sample out of the mold, closing the mold, and filling more materials into the barrel. The entire cycle time is 1 minute. Table 6 and 7 provides test results for various properties of the inventive and comparative compositions.

TABLE 4

Inventive Compositions

| Description | First Component | Second Component |
|---|---|---|
| Inv. 1 | 10 wt. % DGDA-2490 | 90 wt. % DMDA-8940 |
| Inv. 2 | 15 wt. % DGDA-2490 | 85 wt. % DMDA-8940 |
| Inv. 3 | 15 wt. % DGDA-2492 | 85 wt. % DMDA-8940 |
| Inv. 4 | 10 wt. % DMDC-6143 | 90 wt. % DMDA-8940 |
| Inv. 5 | 15 wt. % DMDC-6143 | 85 wt. % DMDA-8940 |
| Inv. 6 | 10 wt. % DMDA-6147 | 90 wt. % DMDA-8940 |
| Inv. 7 | 15 wt. % DMDA-6147 | 85 wt. % DMDA-8940 |
| Inv. 8 | 10 wt. % DMDA-6150 | 90 wt. % DMDA-8940 |
| Inv. 9 | 15 wt. % DMDA-6150 | 85 wt. % DMDA-8940 |

TABLE 5

Comparative Compositions

| Description | First Component | Second Component |
|---|---|---|
| Comp. A | | 100 wt. % DMDA-8940 |
| Comp. B | 25 wt. % DMDC-1250 | 75 wt. % DMDA-8940 |
| Comp. C | 5 wt. % DMDA-6147 | 95 wt. % DMDA-8940 |
| Comp. D | 5 wt. % DMDA-6150 | 95 wt. % DMDA-8940 |
| Comp. E | 5 wt. % B4020N1331 | 95 wt. % DMDA-8940 |
| Comp. F | 10 wt. % B4020N1331 | 90 wt. % DMDA-8940 |
| Comp. G | 15 wt. % B4020N1331 | 85 wt. % DMDA-8940 |

TABLE 6

Inventive & Comparative Composition Properties

| | Density g/cc | $I_{2.16}$ g/10 min | $I_{21.6}$ g/10 min |
|---|---|---|---|
| Inv. 1 | 0.954 | 19.4 | 603 |
| Inv. 2 | 0.9543 | 13.7 | 511 |
| Inv. 3 | 0.9539 | 12.8 | 482 |
| Inv. 4 | 0.9522 | 21.4 | 576 |
| Inv. 5 | 0.9538 | 15.6 | 474 |
| Inv. 6 | 0.9533 | 19.1 | 539 |
| Inv. 7 | 0.9533 | 13.9 | 432 |
| Inv. 8 | 0.9543 | 17.9 | 491 |
| Inv. 9 | 0.9546 | 11.4 | 398 |
| Comp. A | 0.951 | 44.0 | 840 |
| Comp. B | 0.9545 | 17.9 | 600 |
| Comp. C | 0.9534 | 27.3 | 690 |
| Comp. D | 0.9544 | 27.5 | 718 |
| Comp. E | 0.9542 | 34.2 | 750 |
| Comp. F | 0.9544 | 26.7 | 683 |
| Comp. G | 0.9543 | 24.1 | 625 |

TABLE 6

Inventive & Comparative Composition Properties Cont'd

| | $M_{n,cc}$ g/mol | $M_{w,cc}$ g/mol | $M_{z,cc}$ g/mol | MWD $(M_{w,cc}/M_{n,cc})$ | $M_{w,abs}$ g/mol | $M_{z,abs}$ g/mol |
|---|---|---|---|---|---|---|
| Inv. 1 | 9,985 | 65,952 | 525,411 | 6.61 | 86,512 | 1,427,361 |
| Inv. 2 | 9,856 | 77,406 | 689,059 | 7.85 | 99,949 | 1,558,860 |
| Inv. 3 | 9,870 | 75,922 | 754,157 | 7.69 | 97,505 | 1,774,513 |
| Inv. 4 | 9,199 | 61,482 | 585,173 | 6.68 | 81,905 | 2,130,158 |
| Inv. 5 | 10,351 | 73,725 | 1,092,265 | 7.12 | 94,326 | 2,661,331 |
| Inv. 6 | 10,956 | 65,615 | 599,371 | 5.99 | 105,353 | 3,320,005 |
| Inv. 7 | 10,810 | 69,129 | 661,563 | 6.39 | 110,573 | 3,397,945 |
| Inv. 8 | 10,472 | 68,536 | 938,678 | 6.54 | 95,454 | 3,232,529 |
| Inv. 9 | 9,767 | 82,707 | 1,259,138 | 8.47 | 106,473 | 2,629,063 |
| Comp. A | 9,448 | 45,889 | 200,227 | 4.86 | 61,046 | 1,891,889 |
| Comp. B | 9,603 | 65,084 | 407,781 | 6.78 | 83,337 | 1,281,362 |
| Comp. C | 10,913 | 58,575 | 464,183 | 5.37 | 100,547 | 3,570,057 |
| Comp. D | 9,529 | 56,611 | 509,921 | 5.94 | 77,929 | 2,500,915 |
| Comp. E | 10,370 | 47,945 | 197,425 | 4.62 | 62,542 | 1,409,107 |
| Comp. F | 9,654 | 52,689 | 263,766 | 5.46 | 71,286 | 1,799,036 |
| Comp. G | 9,882 | 54,593 | 268,721 | 5.52 | 75,452 | 1,881,762 |

| | $V_{0.1}$ Pa·s | $V_{100}$ Pa·s | $V_{0.1}/V_{100}$ |
|---|---|---|---|
| Inv. 1 | 881 | 243 | 3.6 |
| Inv. 2 | 1,352 | 280 | 4.8 |
| Inv. 3 | 1,504 | 277 | 5.4 |
| Inv. 4 | 634 | 209 | 3.0 |
| Inv. 5 | 1,042 | 252 | 4.1 |
| Inv. 6 | 703 | 214 | 3.3 |
| Inv. 7 | 1,243 | 254 | 4.9 |
| Inv. 8 | 912 | 229 | 4.0 |
| Inv. 9 | 1,843 | 294 | 6.3 |
| Comp. A | 176 | 134 | 1.3 |
| Comp. B | 693 | 251 | 2.8 |
| Comp. C | 449 | 186 | 2.4 |
| Comp. D | 412 | 162 | 2.5 |
| Comp. E | 248 | 171 | 1.4 |
| Comp. F | 332 | 199 | 1.7 |
| Comp. G | 339 | 191 | 1.8 |

The measured durability of living hinges fabricated from the inventive and comparative resins are reported in Tables 6. Hinge sample 1 is made from inventive resin 1. Hinge sample 2 is made from inventive resin 2. Hinge sample 3 is made from inventive resin 3. Hinge sample 4 is made from inventive resin 4. Hinge sample 5 is made from inventive resin 5. Hinge sample 6 is made from inventive resin 6. Hinge sample 7 is made from inventive resin 7. Hinge sample 8 is made from inventive resin 8. Hinge sample 9 is made from inventive resin 9. Hinge sample A is made from comparative resin A. Hinge sample B is made from comparative resin B. Hinge sample C is made from comparative resin C. Hinge sample D is made from comparative resin D. Hinge sample E is made from comparative resin E. Hinge sample F is made from comparative resin F. Hinge sample G is made from comparative resin G. All hinge samples are made according to the procedure described in the Living Hinge Durability test method.

TABLE 7

Living Hinge Durability Test Results

| | Number of Cycles to Break |
|---|---|
| Hinge 1 | 1422 |
| Hinge 2 | 2137 |
| Hinge 3 | 2130 |
| Hinge 4 | 891 |
| Hinge 5 | 1353 |
| Hinge 6 | 897 |
| Hinge 7 | 1284 |
| Hinge 8 | 1305 |
| Hinge 9 | 2075 |
| Hinge A | 331 |
| Hinge B | 1323 |
| Hinge C | 583 |
| Hinge D | 731 |
| Hinge E | 546 |
| Hinge F | 680 |
| Hinge G | 936 |

The results show that the inventive compositions have good processability, and furthermore, living hinges fabricated from the inventive compositions are more durable (i.e., have a high number of cycles to break) than those fabricated from the comparative compositions at the same blending ratio.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A polyethylene composition suitable for use in a living hinge component, the composition comprising:
    a first ethylene-based polymer component, wherein the first ethylene-based polymer component has a density of from 0.940 g/cc to less than 0.960 g/cc, a melt index, $I_{2.16}$, of less than 0.5 g/10 min, and a weight average molecular weight as measured by gel permeation chromatography using conventional calibration, $M_{w,cc}$, of greater than or equal to 200,000 g/mol; and
    a second ethylene-based polymer component;
    wherein the composition has an overall density of from 0.945 g/cc to 0.960 g/cc and an overall melt index, $I_{2.16}$, of from 10 g/10 min to 70 g/10 min.

2. The composition of claim 1, wherein the composition comprises from 7 wt. % to 20 wt. % of the first ethylene-based polymer component, and from 80 wt. % to about 93 wt. % of the second ethylene-based polymer component.

3. The composition of claim 1, wherein the second ethylene-based polymer component has a density from 0.940 g/cc to less than 0.970 g/cc and a melt index, $I_{216}$, of 20-150 g/10 min.

4. The composition of claim 1, wherein the first ethylene-based polymer component has a molecular weight distribution, $M_{w,cc}/M_{n,cc}$, of greater than or equal to 15, wherein the $M_{n,cc}$ is the number average molecular weight as measured by gel permeation chromatography using conventional calibration.

5. The composition of claim 1, wherein the first ethylene-based polymer component has a complex viscosity ratio, $V_{0.1}/V_{100}$, of greater than or equal to 10.

6. A living hinge component comprising a polyethylene composition, the composition comprising:
    a first ethylene-based polymer component, wherein the first ethylene-based polymer component has a density of from 0.940 g/cc to less than 0.960 g/cc, a melt index, $I_{2.16}$, of less than 0.5 g/10 min, and a weight average molecular weight, $M_{w,cc}$, as measured by gel permeation chromatography using conventional calibration of greater than or equal to 200,000 g/mol; and
    a second ethylene-based polymer component;
    wherein the composition has an overall density of from 0.945 g/cc to 0.960 g/cc and an overall melt index, $I_{2.16}$, of from 10 g/10 min to 70 g/10 min.

7. The component of claim 6, wherein the composition comprises from 7 wt. % to 20 wt. % of the first ethylene-based polymer component, and from 80 wt. % to about 93 wt. % of the second ethylene-based polymer component.

8. The component of claim 6, wherein the second ethylene-based polymer component has a density from 0.940 g/cc to less than 0.970 g/cc and a melt index, $I_{2.16}$, of 20-150 g/10 min.

9. The component of claim 6, wherein the first ethylene-based polymer component has a molecular weight distribution, $M_{w,cc}/M_{n,cc}$, of greater than or equal to 15, wherein the $M_{n,cc}$ is the number average molecular weight as measured by gel permeation chromatography using conventional calibration.

10. The component of claim 6, wherein the first ethylene-based polymer component has a complex viscosity ratio, $V_{0.1}/V_{100}$, of greater than or equal to 10.

11. The component of claim 6, wherein the component exhibits a hinge durability of greater than 800 cycles, as measured by the Hinge Durability Test.

* * * * *